(12) United States Patent
Foster-Pegg (10) Patent No.: US 6,748,743 B1
(45) Date of Patent: Jun. 15, 2004

(54) INDIRECTLY HEATED GAS TURBINE CONTROL SYSTEM

(76) Inventor: Richard W. Foster-Pegg, 1224 Princeton La., West Chester, PA (US) 19380

( * ) Notice: Subject to any disclaimer, the term of this patent is extended or adjusted under 35 U.S.C. 154(b) by 0 days.

(21) Appl. No.: 10/188,480

(22) Filed: Jul. 3, 2002

(51) Int. Cl.[7] .................. F01K 21/06; F01K 19/00; F01B 31/00; F16K 17/14; F16K 17/40
(52) U.S. Cl. ................ 60/646; 60/657; 60/660; 60/661; 60/666; 137/68.19; 137/68.3
(58) Field of Search .............. 137/68.3, 68.19; 60/646, 657, 658, 660, 661, 666, 682

(56) References Cited
U.S. PATENT DOCUMENTS 5,076,312 A * 12/1991 Powell ............... 137/68.3

* cited by examiner

*Primary Examiner*—Sheldon J. Richter
(74) *Attorney, Agent, or Firm*—Mckellar Stevens, PLLC; Robert L. Mckellar (57) ABSTRACT

A system for the control of an indirectly heated gas turbine comprising a primary system of controlling the temperature of heated compressed gas entering the expander, and an independent secondary system which includes a safety valve for instantaneous release of heated compressed gas to the atmosphere. The primary system controls system gas temperature and power output by modulating a flow of unheated compressed gas which bypasses the heat exchanger and mixes with the heated gas leaving the heat exchanger to produce a lower temperature gas entering the expander. The secondary system provides a backup means of overspeed prevention, and includes a safety valve to instantly discharge to the atmosphere hot compressed gas upstream of the expander by being responsive to the speed of the turbine. The safety valve includes a frangible membrane clamped between parallel flanges within the ducting, and further includes a dagger assembly for rupturing the membrane.

10 Claims, 5 Drawing Sheets

INDIRECTLY HEATED GAS TURBINE CONTROL SYSTEM

FIELD OF THE INVENTION

The invention is directed to the control of indirectly heated gas turbines. Specifically, this invention is directed to a primary system of controlling the temperature of heated compressed gas entering the expander, and a secondary (or backup) system which includes a safety valve for instantaneous release of heated compressed gas to the atmosphere to prevent overspeed of the turbine.

BACKGROUND OF THE INVENTION

Typical single shaft, indirectly heated gas turbines comprise a compressor for producing compressed gas, a gas-to-gas heat exchanger for indirectly heating the compressed gas to produce heated compressed gas, an expander for expanding the heated compressed gas, and a generator connected to the single shaft for producing electricity. The control system of single shaft, indirectly heated gas turbines is responsible for safe operation of the power generation plant from start-up to shutdown, and protection against all eventualities. The control system is required to be "fail-safe", and shut the plant down safely upon the occurrence of any dangerous condition.

In conventional gas turbines the gas is heated by combustion of fuel directly in the compressed gas. This is called Internal Combustion. In an indirectly heated gas turbine, the gas is indirectly heated in a heat exchanger by conduction of heat through membrane walls. The membrane walls are heated by hot gases produced in a separate process, such as external combustion at near atmospheric pressure or such as exhaust gases from an industrial process.

The power of both conventional gas turbines and indirectly heated gas turbines is modulated by control of the temperature of the hot gas entering the expander. In a conventional (internal combustion) gas turbine, modulation of the hot gas entering the expander is achieved by modulation of the combustion of fuel. However, to change the temperature of compressed gas in an indirectly heated gas turbine, an adjustment of the heat input to the heat exchanger, as well as the temperature of the tubes within the heat exchanger needs to change before the temperature of the gas entering the expander will change. The internal components of the heat exchanger, such as the tubes and their supports, heat up and cool down slowly. Thus it is not possible to control the temperature of the heated gas of an indirectly heated gas turbine sufficiently fast for normal power swings, or in an emergency, by control of the heat input to the heat exchanger.

As is normal for all turbo machinery there are two separate control systems to protect against one of the systems developing a fault. The security of two systems is required to protect personnel and the equipment against catastrophic failure of the turbine by overspeed should one of the control systems fail. Two systems are required to meet code, to obtain insurance and avoid onus in litigation in the most unlikely event of failure. These systems must provide sufficiently fast adjustment of the temperature and/or flow of the heated, compressed gas entering the expander to compensate for sudden changes, minor and major, in load, and must also provide a fail-safe means of instantaneous shut off in the event of an overspeed of the turbine.

SUMMARY OF THE INVENTION

The inventive control systems for control of indirectly heated gas turbines are responsible for safe operation of the plant from start-up to shutdown, and protection against all eventualities. The control system is required to be "fail-safe", and shut the plant down safely upon the occurrence of any dangerous condition. In the proposed system all normal operation, including emergency shut down is managed by a primary, or #1 Control System. The secondary, or #2 Control System, functions to stop the plant in an emergency should the #1 Control System malfunction.

The #1 Control System controls system gas temperature and power output by modulating a flow of unheated compressed gas which flows through a bypass duct and valve which bypasses the heat exchanger and mixes with the heated gas leaving the heat exchanger to produce a lower mixed temperature entering the expander. In this way, the temperature of the gas and the power output can be changed rapidly.

The #1 Control System may also include additional means of quickly reducing or stopping the power of the indirectly heated gas turbine. An additional valve, referred to as a blocker valve, may be installed in the outlet of the heat exchanger. By closing the blocker valve, the flow through the heat exchanger is resisted, causing more unheated gas to flow through the bypass duct. This will further reduce the temperature of the gas entering the expander and obtain a faster reduction of power than can be produced by the bypass duct and valve alone, as may be required for overspeed protection.

The #2 Control System provides a second means of overspeed prevention, and includes a safety valve to instantly discharge to atmospheric pressure approximately half of the hot compressed gas upstream of the expander. The remaining half of the hot compressed gas will continue to pass through the expander and produce power but not enough to accelerate the indirectly heated gas turbine, thus preventing overspeed. For purposes of this invention, "safety valve" is defined as a device that is responsive to the speed of the turbine as opposed to responsive to pressure provided by a gas, steam, or a liquid. The safety valve includes a rupture disk that is critical to the operation of the inventive safety value, and comprises a frangible membrane clamped between parallel flanges within the ducting, and further includes a dagger assembly for rupturing the frangible membrane. The dagger assembly is actuated using compressed gas generated within the turbine.

DETAILED DESCRIPTION OF THE INVENTION

Figure 1:
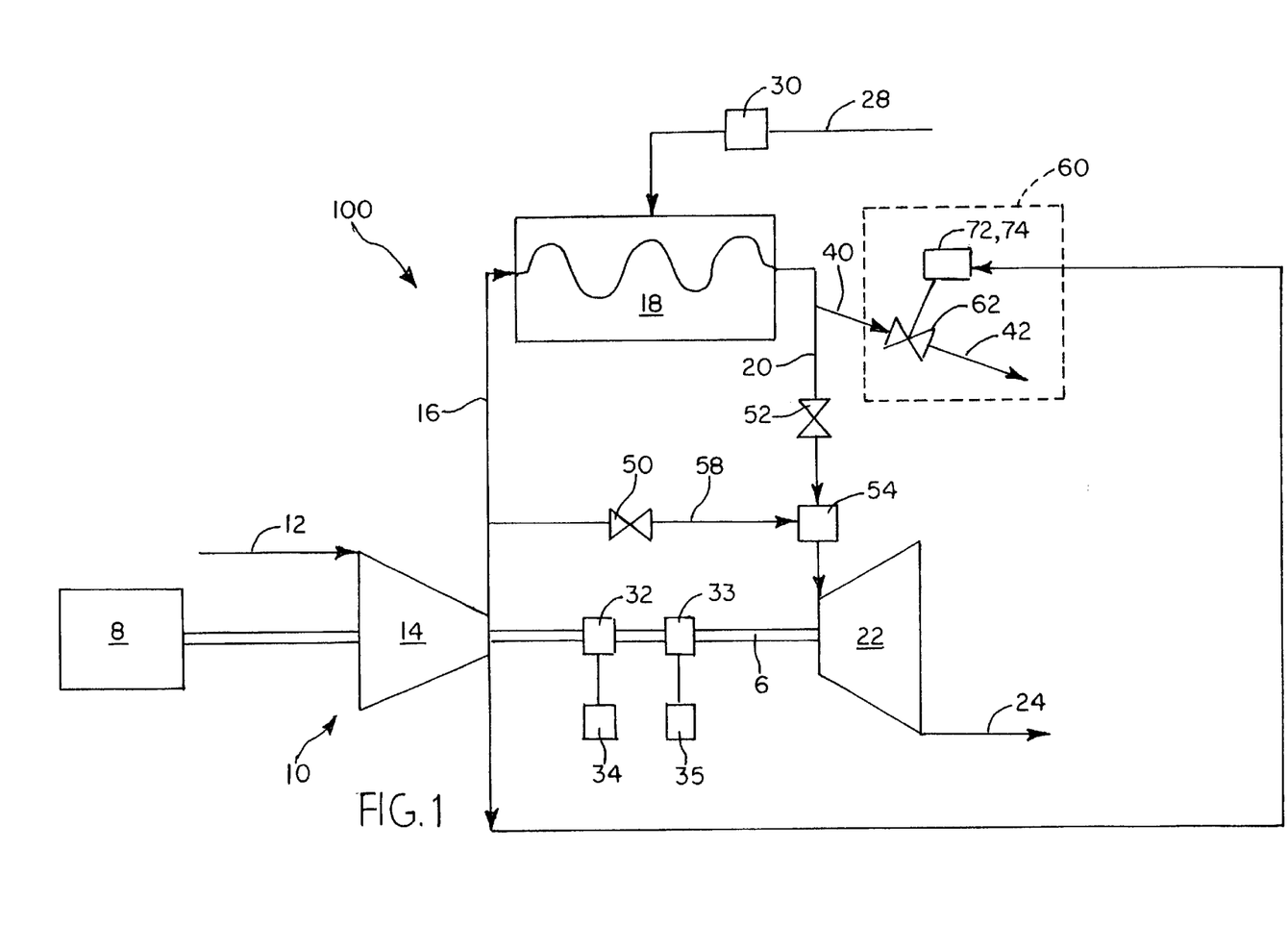
FIG. 1 is a schematic diagram of the system for controlling the power output of a single shaft indirectly heated gas turbine, illustrating the bypass system for controlling compressed gas temperature as it enters the expander, as well as the safety valve, located upstream from the expander, for instantaneous release of high pressure, high temperature gas to the atmosphere in overspeed conditions.

Referring now to the figures, the indirectly heated gas turbine control systems will now be described in detail. FIG. 1 discloses a schematic diagram of the inventive indirectly heated gas turbine control system 100. Illustrated is a typical single shaft, indirectly heated gas turbine 10, which includes, but is not limited to, a compressor 14 for producing compressed gas from ambient gas entering gas turbine 10 at inlet 12, a first duct 16 for directing the flow of compressed gas from compressor 14 to a gas-to-gas heat exchanger 18, where heat exchanger 18 indirectly heats the compressed gas to produce heated compressed gas, a second duct 20 for directing the flow of heated, compressed gas from heat exchanger 18 to expander 22, where expander 22 expands the heated compressed gas, the heated expanded gas exiting gas turbine 10 at outlet 24, and a generator 8 connected to the single shaft 6 for producing electricity. Although a single shaft indirectly heated gas turbine is used for purposes of description, it is understood that the inventive concept can be applied to other types of turbines.

It is understood that the schematic of FIG. 1 illustrates only the basic elements necessary for providing an operating indirectly heated gas turbine system. This has been done to allow clear explanation of the inventive control systems. However, other elements which include, but are not limited to, an injection steam source and other well known elements of such power plant systems may also be included which improve function of the system as a whole.

The indirectly heated gas turbine #1 Control System regulates the gas temperature entering expander 22 by adjusting the amount of unheated gas bypassing heat exchanger 18 to mix with the heated gas passing through heat exchanger 18. The bypass consists of a third duct, or bypass duct 58 for directing the flow of compressed gas from first duct 16 at a location between compressor 14 and heat exchanger 18, and connecting to second duct 20 at a location between heat exchanger 18 and expander 22. Bypass duct 58 allows a flow of unheated compressed gas to enter the expander. The flow through bypass duct 58 is controlled by bypass valve 50. Bypass valve 50 is preferably a butterfly valve, but another appropriate conventional valve may be substituted for the butterfly valve. Bypass valve 50 controls indirectly heated gas turbine 10 by regulating the temperature of the mixed hot and cold gas entering expander 22. Bypass duct 58 is joined to duct 20 upstream of expander 22. Bypass duct 58 joins duct 20 in a conventional manner, or a mixer 54 may be employed at this intersection. Mixer 54 is a component that allows the hot compressed gas from heat exchanger 18 to intermix with the cold, compressed gas from compressor 14.

The primary control of indirectly heated gas turbine 10 is with this #1 Control System. It controls temperature, power and speed, when not synchronized to the generator, and controls temperature and power when speed is controlled by the governor or synchronized to line frequency. The #1 Control System and bypass valve 50 also prevent overspeed in the event of loss of load, or other malfunction. Normal Operation and Control, #1 Control System The following is a general description of the startup and operation of a typical single shaft indirectly heated gas turbine, and is provided for the purpose of illustrating the inventive control systems. It is understood that individual indirectly heated gas turbines may require specific alterations from this general description and that different types of turbine systems have their own unique requirements, including different sequences, temperatures, etc.

Indirectly heated gas turbine 10, or the plant, is started after all auxiliaries have been activated and are indicated to be safe to proceed, and combustion has been initiated. Heat exchanger 18 is warmed by the heat from external hot gas source 28, which is controlled 30 independently of the #1 Control System. In the preferred embodiment, hot gas source 28 consists of the products of combustion (flue gas) passing through heat exchanger 18. It is understood, however, that hot gas source 28 may be generated from other sources that include, but are not limited to, the exhaust gases of industrial processes. Indirectly heated gas turbine 10 will be cranked while being warmed.

When the temperature of the gas entering expander 22 of indirectly heated gas turbine 10 has reached about 1000° F., indirectly heated gas turbine 10 will become self-supporting and accelerate away from the cranking device. With the speed-load governor set to 50% speed indirectly heated gas turbine 10 will slowly accelerate to this speed at which the controls 34 will open the bypass valve 50, directing unheated compressed gas into bypass duct 58 so as to reduce the temperature entering expander 22 and maintain the set speed. Temperature of the gas leaving heat exchanger 18 will be raised while restraining speed by controlling the gas flow using bypass valve 50 through the governor setting. When the gas temperature leaving heat exchanger 18 is adequate to produce 10% load, the speed will be progressively increased to synchronous by raising the speed setting, which modulates bypass valve 50. Temperature of hot gas source 28 will be increased, for example by firing of the combustion system, to maintain the outlet temperature from heat exchanger 18 as speed and power increase. When the frequency of generator 8 matches and is in phase with the line frequency, generator 8 is synchronized and connected to the line. Bypass valve 50 is then further closed to direct additional gas flow to heat exchanger 18 to raise temperature and apply approximately 10% load. Temperature and load can then be further increased to obtain the required power output by firing additional fuel.

Operation Connected to an Electric Grid

The speed governor will be set to 102% of synchronous speed and bypass valve 50 will close fully, so as to direct all compressed gas to heat exchanger 18 and thus maximize the power produced by indirectly heated gas turbine 10. Power will be maximized with the bypass valve 50 fully closed and all the compressed gas passing through heat exchanger 18. The outlet temperature of heat exchanger 18 will determine the power output. With the generator speed locked into the line frequency, fluctuations in temperature will affect power exported to the utility transmission line. A means will be provided, separate from indirectly heated gas turbine control system 100, to control fuel and prevent overheating of the heat exchanger 18 firing, and limit the gas temperature leaving the heat exchanger 18. In FIG. 1, this means is represented by hot gas control 30.

Operation Isolated from an Electric Grid

If indirectly heated gas turbine 10 is generating on an isolated system the indirectly heated gas turbine control system 34 will be set to hold the required frequency, 60 or 50 cycle, producing only the power demanded by the equipment on the isolated system. The control system 34 will hold speed and frequency by adjustment of bypass valve 50 to control power. Assuming that the power demand will fluctuate above and below a mean it is necessary for the turbine to be able to both increase and decrease power to hold frequency. To meet this situation, bypass valve 50 will be partially open at mean power demand and will cycle open and closed as necessary to match the power output to demand. A separate and independent control, hot gas control 30, will adjust the fuel fired to maintain the necessary heat input. The outlet temperature of heat exchanger 18 will be set to its normal gas outlet temperature and the heat input varied by the quantity of the heated compressed gas blended with the bypassed compressed gas. The temperature of this blended hot and cold (bypassed) gas entering the expander will cycle between the maximum (fully closed bypass valve 50) and somewhat below maximum (partially open bypass valve 50) to follow the load. If the connected load on an isolated system should exceed the power capability of indirectly heated gas turbine 10, speed and frequency will drop and some of the load will be shed to allow normal speed and frequency to be recovered.

Indirectly heated gas turbine 10 will idle, producing no power, at a gas temperature of about 1000° F. The heat exchanger bypass system 50, 58 will be designed to be able to reduce power to zero, when called for, by reducing inlet gas temperature at expander 22 to approximately 1000° F., at all conceivable conditions of fuelling of the heat exchanger 18, including a heat input to the heat exchanger 18 somewhat in excess of design. The primary control of power is by adjustment of the gas temperature entering expander 22, between approximately 1000° F. and approximately 1600° F.

Emergency Shut Down

The control systems of all turbines include means of bringing the engine to a safe stop whenever a potentially dangerous or damaging situation is detected. These conditions include overspeed and also, over-temperature, loss of lubricating oil pressure, and excessive vibration. "Panic" buttons in the control and turbine rooms can also activate the system manually. To prevent overspeed occurring, all industrial machines that are susceptible to dangerous overspeed are required by international code to incorporate two separate automatic systems to bring the plant to a safe stop. The systems are called "Trip" systems.

The responses required of an indirectly heated gas turbine to a "Trip" signal will be the same "crash stop" as for a normal gas turbine. The response to a minor emergency is a normal shut down by stopping the fuel input and allowing the system to come to a normal slow stop.

Prevention of Overspeed

The power being demanded of a power plant may change instantly, for example the generator circuit breaker can jump out, causing the load absorbed by the electric generator to immediately dissipate. In a liquid or gas fuelled (internal combustion) turbine this situation can be met by closing the fuel throttle or stop valve, which drops the power output to zero in a second. In an indirectly heated gas turbine shutting off the fuel supply will not affect power output for minutes and then only slowly. Without special means of cutting the power output upon loss of load, an indirectly heated gas turbine would accelerate into overspeed in just a few seconds. If speed of a turbine rises significantly above the design speed, major damage will occur and the machine can even explode like a bomb. This is the most serious failure that can occur in a turbine. Lives have been lost from this occurrence.

The #1 Control System, as described above, is one of the two mandated fail-safe systems required, each able to stop the turbine in an emergency such as loss of load. A fast rate of change of gas temperature and power output is obtained by fully opening bypass valve 50 to dilute the heated gas leaving heat exchanger 18 to produce a lower mixed temperature entering expander 22. By this system the temperature of the gas and the power output can be changed very fast. In response to a "Trip" signal, bypass valve 50 will automatically, instantly, open fully.

In the case of loss of load the restraining force of the generator will be lost and additional means of instantly stopping the power of indirectly heated gas turbine 10 may be necessary. For this situation an additional valve, referred to as blocker valve 52, may be installed in the outlet of heat exchanger 18 upstream of the junction of bypass duct 58 with duct 20. By closing blocker valve 52 the gas flow through heat exchanger 18 is resisted, causing more unheated gas to flow through bypass duct 58. This will further reduce the temperature of the gas entering expander 22 and obtain a faster reduction of power than can be produced by bypass valve 50 alone, as may be required for overspeed protection.

Blocker valve 52, in conjunction with bypass valve 50 and duct 58, is designed to reduce the gas flow through heat exchanger 18 to approximately one third of the gas flow from compressor 14, so two-thirds of the gas flow from compressor 14 will bypass heat exchanger 18 reducing the temperature entering expander 22 from full load temperature to less than 1000° F. At this temperature the power produced by expander 22 will be approximately 50% of full load and less than required to drive compressor 14. The net power will be negative and the turbine will slow down. This prevents the speed of the indirectly heated gas turbine from accelerating and prevents over speed. Bypass valve 50 is also used to control normal power changes etc.

It is important to note that the design investigation of the overspeed protection system will determine whether blocker valve 52 is necessary. It may be found that the bypass alone will adequately control overspeed, eliminating the need for blocker valve 52.

Backup Operation and Control, #2 Control System

The codes of the International Standards Organization, followed throughout the world, require that all turbomachinery be equipped with two overspeed prevention systems, each independently capable of preventing overspeed on loss of full power absorption. Each system is required to be separate and prevent overspeed alone should the other system be inoperative. The normal control of load, speed, and prevention of overspeed of indirectly heated gas turbine 10 is achieved by employing the #1 Control System, already described. A second, completely separate, automatic, fail safe means of stopping the plant is necessary and required by international code, in case the #1 Control System fails to operate. This is achieved using the inventive #2 Control System which operates by diverting hot compressed gas away from the inlet to expander 22, thus reducing the turbine power, slowing and stopping the turbine. The #2 Control System will operate only following a failure of the #1 Control System to control the speed of indirectly heated gas turbine 10.

The #2 Control System for indirectly heated gas turbine 10 consists of a safety valve to instantly discharge to atmospheric pressure approximately half of the hot compressed gas upstream of the inlet to expander 22. In the preferred embodiment, the safety valve is positioned at the outlet of heat exchanger 18, upstream of blocker valve 52 and mixer 54. The remaining half of the hot compressed gas will continue to pass through expander 22 and produce power but not enough to accelerate the turbine, thus preventing overspeed.

The specifications for the safety valve are stringent. It must withstand constant pressure differentials in the range of approximately 100 to 200 psi over thousands of hours of operation. It must open instantly, with no inclination to jam or seize when triggered. There must be no leakage through the closed valve, and it must be capable of withstanding moderate temperatures of approximately 600 degrees F., for reasons of performance and longevity. It must be fail-safe so any failure of its system will cause it to open as opposed to not opening. It must seldom operate in error and it cannot be prohibitively expensive.

Figure 2:
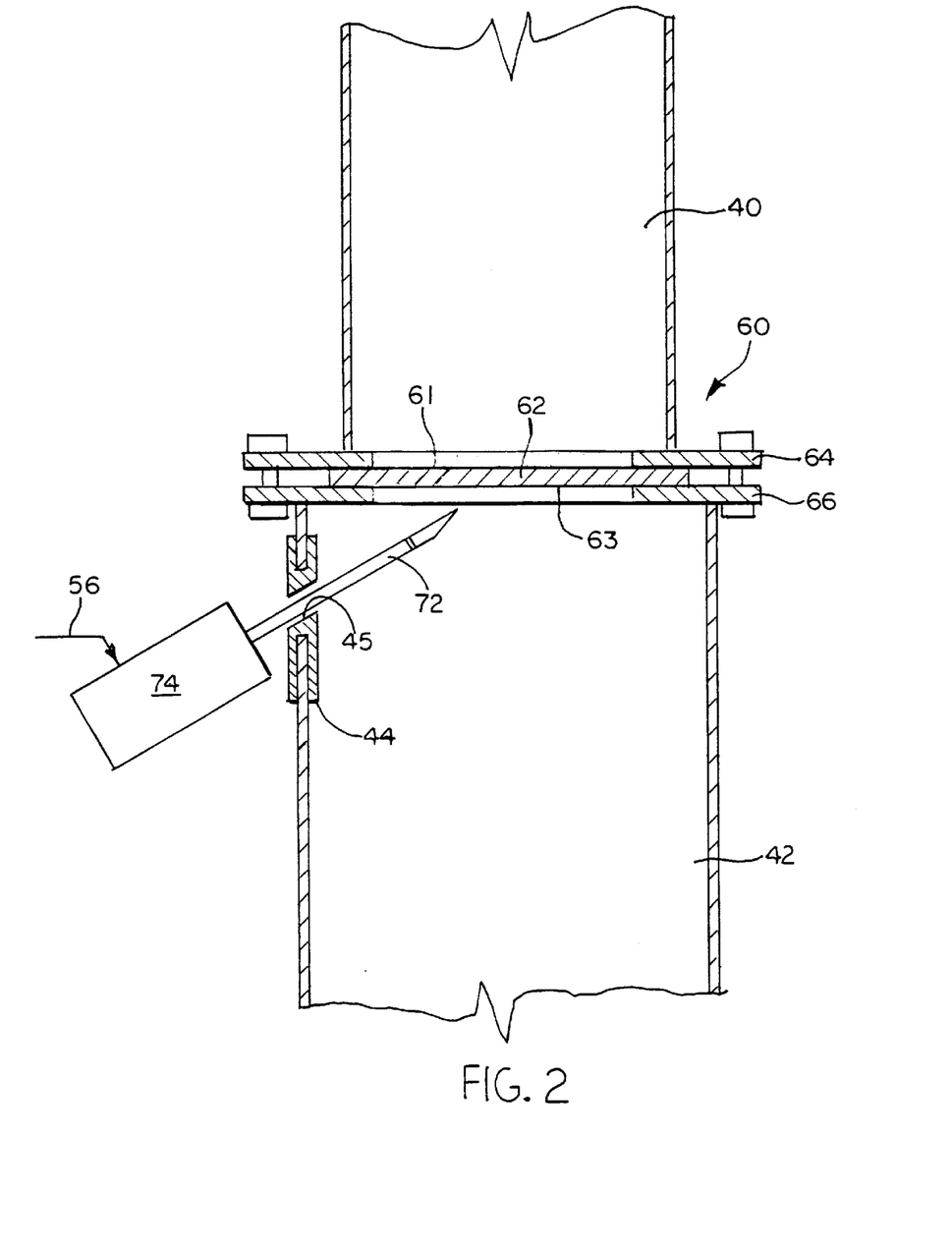
FIG. 2 is a side sectional view of the safety valve illustrating the rupturable membrane mounted between flanges within an offtake of the fluid stream between the heat exchanger and the expander, and illustrating the rupture means positioned adjacent to the rupturable membrane.

A safety valve will now be described, with reference to FIGS. 2 and 3, which meets all the above specifications. In the preferred embodiment, the safety valve is an assembly that includes rupture disk 60 located in an offtake 40 of the compressed gas ducting 20 between heat exchanger 18 and expander 22 of indirectly heated gas turbine 10. Rupture disk 60 consists of a frangible membrane 62 clamped between a pair of parallel flanges 64, 66 oriented normal to the direction of fluid flow within duct 40 such that it completely obstructs the fluid stream within duct 40. Frangible membrane 62 is a thin sheet having a first surface 61 exposed to the hot, compressed gas within duct 40, and having a second surface 63 opposed to the first surface which is exposed to the ambient gas within exhaust duct 42. In the preferred embodiment, second surface 63 is provided with score marks 68 manufactured on the surface which predetermine the tear lines in membrane 62 at rupture. However, membrane 62 may be provided without score marks 68. When undamaged, rupture disk 60 withstands the pressure differential between the upstream side of membrane 62 where it is exposed to the compressed gas, and the downstream side where it is exposed to atmospheric pressure.

Figure 3A:
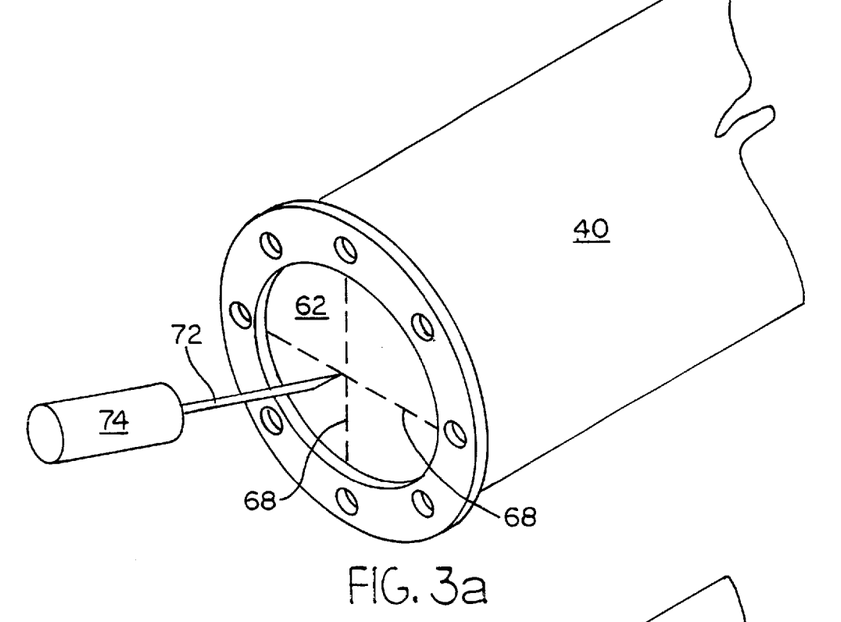
FIG. 3a is a perspective view of the safety valve illustrating the retracted rupture means positioned adjacent to the rupturable membrane and directed toward the (optional) score lines in the membrane surface.
Figure 3B:
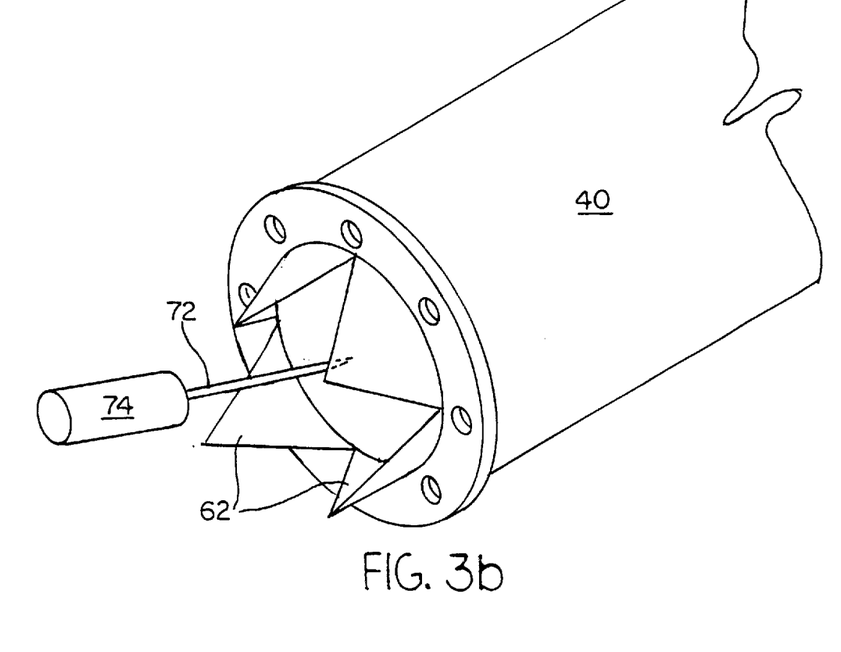
FIG. 3b is a perspective view of the safety valve of FIG. 3a, illustrating the rupture means after it has been propelled through the rupturable membrane and illustrating the rupturable membrane ruptured along score lines.

Rupture of rupture disk 60 is initiated by disk rupture means, which consists of puncture means 72 actuated by puncture means actuator 74 (FIG. 3A). Puncture means 72 and actuator 74 are positioned on the downstream side of rupture disk 60 so as to avoid exposure to the high pressures and temperatures within duct 40. In the preferred embodiment, puncture means 72 and actuator 74 lie outside exhaust duct 42 and act through an opening 45 in duct 42. This positioning allows easy inspection, maintenance, and repair of the disk rupture means, and minimizes its damage from exhausted high temperature gas in the event of activation.

In the preferred embodiment, puncture means 72 comprises an elongate rod 78 that terminates at its distal end 71 in a detachable dagger 76. Dagger 76 is a sharp element that may be flat in profile, as in a scalpel blade or knife, or may have some thickness that terminates in a sharpened point as in a spear or puncture tool. Rod 78 is supported within opening 45 using bushing 44, which angles puncture means 72 toward membrane 62 such that dagger 76 will strike the approximate center of membrane 62. It is well within the scope of this invention, however, to use other means to rupture frangible membrane 62 which include, but are not limited to, propelling a projectile through membrane 62 and detonation of a small explosive device fixed on or near a surface 61, 63 of membrane 62.

Figure 4:
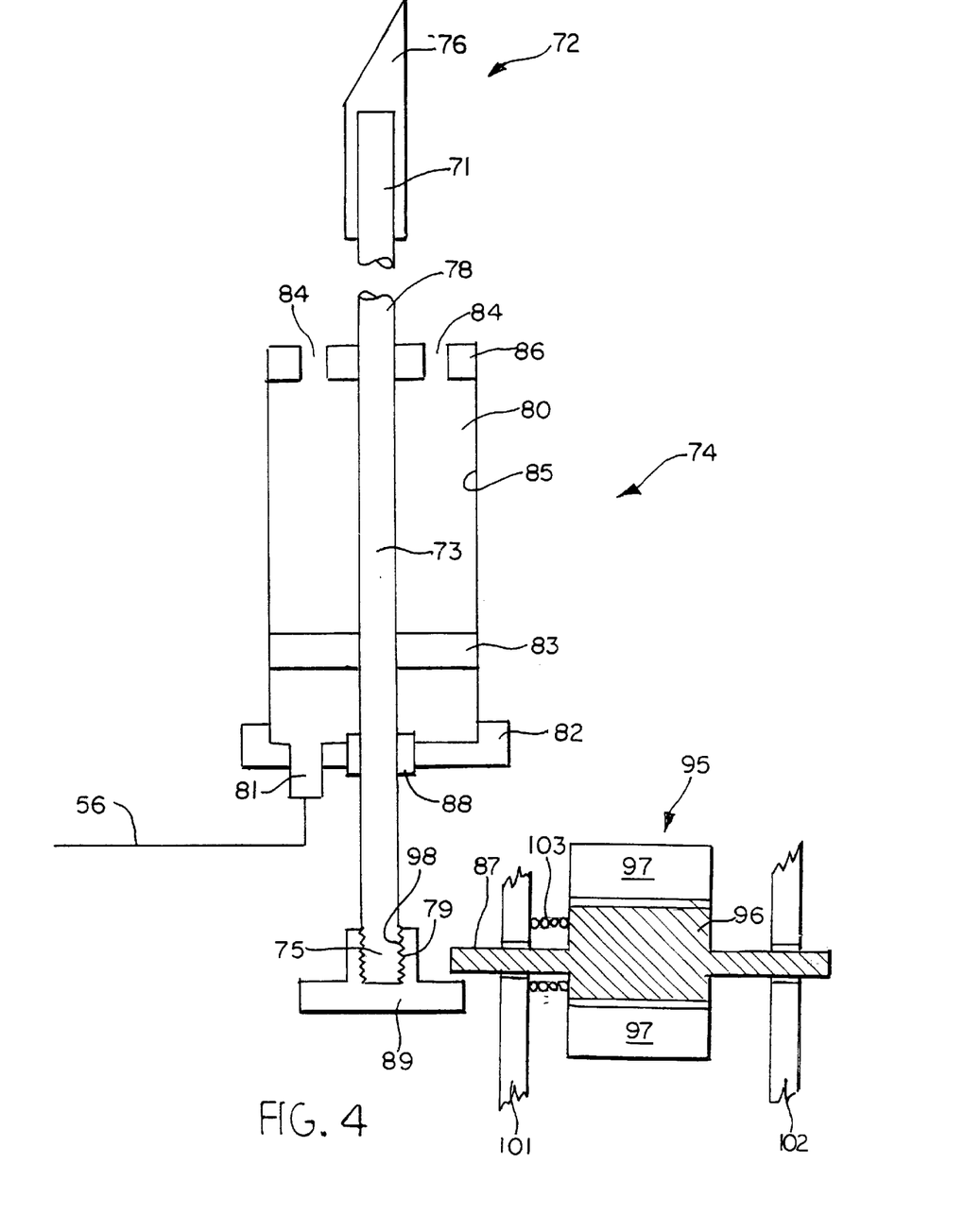
FIG. 4 is a side sectional view of the preferred embodiment of the rupture means, illustrating a sharp, dagger tipped probe mounted on a shaft, the shaft being driven by compressed gas generated by the indirectly heated gas turbine compressor, the shaft being controlled by an electronically triggered latching mechanism.

In the preferred embodiment, puncture means actuator 74 comprises a compressed gas cylinder 80 (FIG. 4). Dagger 76 is driven by rod 78. Mid portion 73 of rod 78 extends through gas cylinder 80. Gas piston 83 is fixed to mid portion 73 within gas cylinder 80 in a location that allows adequate travel of rod 78 to rupture membrane 62 when activated. Compressed gas generated in compressor 14 enters the near end of gas cylinder 80 via gas inlet 81 and is maintained in the near end by a detachable flanged cap 82. The distal end of cylinder 80 terminates in cap 86 that is provided with gas vents 84, allowing gas piston 83 to be driven distally within the cylinder.

In normal operation of indirectly heated gas turbine 10, motion of gas piston 83, and thus dagger 76, is prevented. Near end 75 of rod 78 terminates in a detachable foot, or flange, 89. Near end 75 is provided with exterior threads 79 which are matingly received within a threaded channel 98 on flange 89. Rod 78 and flange 89 are prevented from translation by a catch 87 that abuts the distal surface of flange 89. Catch 87 is supported and maintained in this position by solenoid 95, which includes armature 96 and windings 97.

When the electric circuit is interrupted (or fails), solenoid 95 releases catch 87 allowing catch 87 to be withdrawn by return spring 103, resulting in dagger 76 being driven distally by the compressed gas within compressed gas cylinder 80. Puncture means actuator 74 is positioned adjacent to membrane 62 such that when dagger 76 is driven distally, it slashes membrane 62, initiating rupture. Instantly following the dagger slash, the compressed gas pressure within duct 40 will tear membrane 62 apart like the petals of a flower (FIG. 3B), opening the obstruction for the escape of the compressed gas. The dagger slash raises the stress in the disk at the cut, to exceed the strength of the membrane material. Once damaged, membrane 62 tears instantaneously, along score marks 68 to produce a complete opening of a wide passage for the hot compressed gas to escape. Rupture will occur instantaneously following the dagger slash, releasing the hot compressed gas, thus stopping indirectly heated gas turbine 10.

Failures of control system electrical power will release catch 87 and dagger 76, rupture membrane 62 and shut indirectly heated gas turbine 10 down, thus making the system "fail safe". The compressed gas that drives compressed gas cylinder 80 is obtained from compressor 14 via gas line 56 and therefore loss of compressed gas pressure will only occur when the turbine is stopping or stopped. Thus on loss of gas pressure the system is "fail-safe" and there is no need for intervention of the #2 Control System.

The mechanism feeding fuel to the combustion system or its equivalent will be electrically operated and interlocked with power to the electrical control system. Combustion will not occur and indirectly heated gas turbine 10 will not start unless there is control electric power. In a normal stop, electric power will be maintained until indirectly heated gas turbine 10 has come to a complete stop to maintain auxiliary services and avoid inadvertent rupture of membrane 62 while the engine is slowing. When indirectly heated gas turbine 10 has slowed there will be inadequate pressure from the main compressor to drive dagger 76 to rupture membrane 62, so disconnection or failure of control of electric power after the turbine has slowed will not cause the disk to be ruptured. To prevent inadvertent activation of the rupture mechanism, an incorrect setting of the mechanism and solenoid operated latch will be indicated and interlocked with the startup controls to prevent starting until correctly set.

The safety valve mechanism will be protected from the high normal operating temperature of the indirectly heated gas turbine, which can range up to 2100 degrees F., by a small bleed of unheated gas taken from the compressor outlet. After cooling and protecting the rupture disk assembly, this gas will blend into the main heated gas flow.

The #2 Control System will operate only following a failure of the #1 Control System to control the speed of indirectly heated gas turbine 10. Following deployment of the #2 Control System indirectly heated gas turbine 10 must be stopped to investigate the reason for the overspeed and for the failure of the #1 Control System to check the overspeed, and to replace the ruptured disk.

The rupture disk safety valve 60 is described above with respect to the #2 Control System for use in a single shaft, indirectly heated gas turbine 10. However, the inventive rupture disk 60 is exemplary for use as a safety valve in other types of turbine systems that may include, but are not limited to, multi-shaft turbines, turbines using air as the gas, turbines using gases other than air, and turbines which use direct combustion to heat the working gas.

Interactions of #1 and #2 Control Systems

In cases when the speed might accelerate slowly past normal governed speed, the heat exchanger bypass system 50, 58 will limit speed before the trip speed of either system is reached. The #1 system trip will be set to fire at approximately 2 percent above governed speed. This instantly operates #1 Control System to open the bypass fully, (close the "blocker" valve, if installed) and shut off the fuel feed. The #2 Control System trip will be set to operate at 4 percent above synchronous speed. When the speed reaches 4% the #2 Control System fires, splitting the rupture disk.

If trip #1 checks the acceleration before trip 2 fires, trip #2 will not fire and the rupture disk safety valve 60 will not rupture. If acceleration continues to 4% above the normal limit trip #2 will fire and speed will be checked by a combination of both systems. Disk rupture will only occur upon a major speed surge which is too fast for the #1 bypass control to contain, or if #1 Control System malfunctions.

Controls, on which the safety of the system depends, are required to be fail-safe. This requires that a failure of any element involved in operation of either control system will trigger an alarm, requiring that the plant be taken out of service until the problem is remedied.

The #2 Control System overspeed protection systems will be tested by temporarily setting the governor of the #1 Control System to a speed in excess of the #2 Control System trip speed.

Alternative Systems

The foregoing descriptions are for electronic and electric control systems to be compatible with most contemporary gas turbine systems. However, hydraulic systems are used in some turbines to operate overspeed trip protection systems. Systems following the principles described in the body of this document will operate equally well with hydraulic actuation.

The hydraulic trip systems generally are triggered by a spring-loaded flybolt, usually inserted in the main shaft. The bolt is ejected against the spring by centrifugal force when the trip speed is reached. The radius and weight of the bolt and the spring strength determine the speed at which the bolt is ejected to trip the control. The bolt strikes a valve to release hydraulic fluid and pressure in the trip system, which actuates the safety controls.

In the system for indirectly heated gas turbine 10, the flybolt will release hydraulic pressure to trigger a second embodiment of rupture disk safety valve. A leak or failure of the hydraulic system releases the pressure and trips the system making the system "fail-safe".

In a hydraulic system, the #2 Control System will be operated by the hydraulic trip. The #1 Control System will be operated from another, separate speed governor system as standard for the particular indirectly heated gas turbine.

Figure 5:
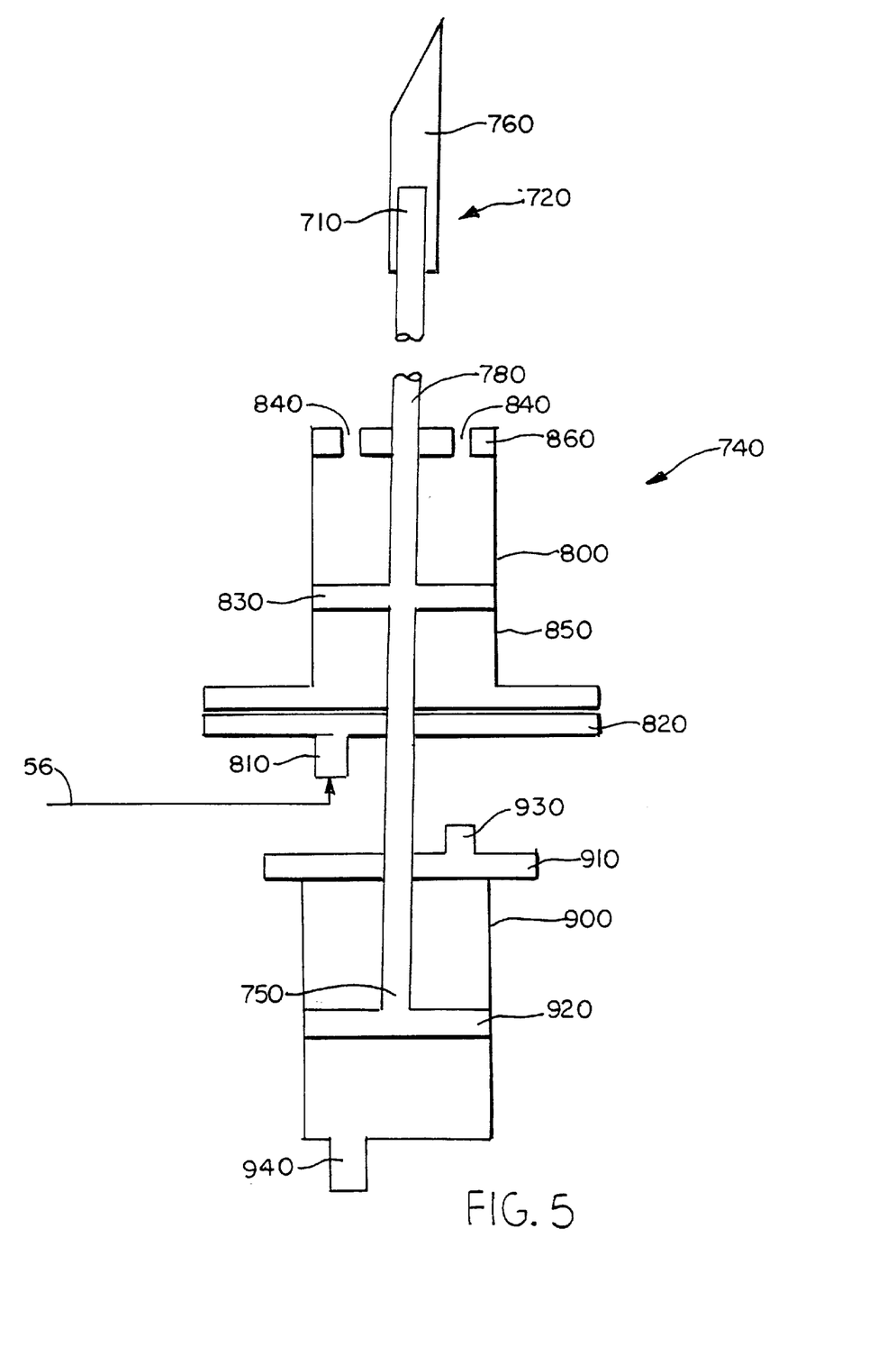
FIG. 5 is a side sectional view of a second embodiment of the rupture means, illustrating a sharp dagger tipped probe mounted on a shaft, the shaft being driven by compressed gas within a compressed gas cylinder and controlled by hydraulic fluid within a hydraulic fluid cylinder.

A second embodiment of the safety valve will now be described, with reference to FIG. 5, for use in a #2 (hydraulic) Control System. The second embodiment is identical to the preferred embodiment 60 in every way except for the mechanism for actuation of the puncture means.

As in the preferred embodiment, rupture of rupture membrane 62 is initiated by disk rupture means, which consists of puncture means 720 actuated by puncture means actuator 740. Second embodiment puncture means 720 is identical to puncture means 72 of the preferred embodiment. Puncture means 720 and actuator 740 are positioned on the downstream side of rupture disk 600 so as to avoid exposure to the high pressures and temperatures within duct 40. Puncture means 720 and actuator 740 lie outside exhaust duct 42 and act through an opening 45 in duct 42. This positioning allows easy inspection, maintenance, and repair of the disk rupture means, and minimizes its damage from exhausted high temperature gas in the event of activation. Puncture means 720 comprises an elongate rod 780 that terminates at its distal end 710 in a detachable dagger 760. Rod 780 is supported within opening 45 using bushing 44, which angles puncture means 720 toward membrane 620 such that dagger 760 will strike the approximate center of membrane 62.

In the second embodiment, puncture means actuator 740 comprises a compressed gas cylinder 800 and hydraulic cylinder 900. Dagger 760 is driven by rod 780 that terminates at its near end 750 in hydraulic fluid piston 920 within hydraulic cylinder 900. Hydraulic fluid enters hydraulic cylinder 900 via hydraulic fluid inlet 930. A hydraulic fluid drain 940 is provided in the near end of hydraulic cylinder 900. Compressed gas cylinder 800 is received about mid portion 730 of rod 780. Gas piston 830 is fixed to mid portion 730 within gas cylinder 800 at a location that permits adequate travel of rod 780 to rupture membrane 62 when activated. Compressed gas enters the near end of gas cylinder 800 via gas inlet 810 and is maintained in the near end by a detachable flanged cap 820. The distal end of cylinder 800 terminates in cap 860 that is provided with gas vents 840, allowing gas piston 830 to be driven distally within gas cylinder 800.

In normal operation of indirectly heated gas turbine 10, the force of the hydraulic fluid on hydraulic piston 920 within hydraulic fluid cylinder 900 is greater than the force of the compressed gas on gas piston 830 within compressed gas cylinder 800. Thus, in normal operation, motion of dagger 760 is prevented due to the restraining force within hydraulic cylinder 900.

In an emergency situation, and when the #1 Control System has malfunctioned, the hydraulic trip system is triggered by the spring-loaded flybolt. The bolt is ejected against the spring by centrifugal force when the trip speed is reached. The bolt strikes a valve to release hydraulic fluid and pressure in the trip system and actuates the safety controls. Upon release of hydraulic fluid, force of the hydraulic fluid on hydraulic piston 920 within hydraulic fluid cylinder 900 is no longer greater than the force of the compressed gas on gas piston 830 within compressed gas cylinder 800, and the force of the compressed gas on gas piston 830 drives dagger 760 distally. As in the preferred embodiment, second embodiment puncture means actuator 740 is positioned adjacent to membrane 62 such that when dagger 760 is driven distally, it slashes membrane 62, initiating rupture. Instantly following the dagger slash, the compressed gas pressure within duct 40 will tear membrane 62 apart, opening the obstruction for the escape of the compressed gas. Rupture will occur instantaneously following the dagger slash, releasing the hot compressed gas, thus stopping indirectly heated gas turbine 10.

The compressed gas that drives compressed gas cylinder 800 is obtained from compressor 14 via gas line 56 and therefor loss of compressed gas pressure will only occur when the turbine is stopping or stopped. Thus on loss of gas pressure the system is "fail-safe" and there is no need for intervention of the #2 Control System.

The discussion of the indirectly heated gas turbine control systems as described herein is directed to a single shaft indirectly heated gas turbine. Gas turbines with more than one shaft require more complicated control systems and analysis. The solutions described herein to modulate and direct the flows of gas are applicable to, and can be applied to any indirectly heated gas turbine system. The detailed calculation and design of a control system will depend on the particular turbine, electric generator, heat exchanger, ducting, etc., and a specific calculation and design is required for each assembly of equipment.

What I claim is:

1. A safety valve for selective instantaneous release of pressurized gas to the atmosphere, the safety valve comprising a rupturable membrane and rupture means, wherein said rupture means is positioned in close proximity to said rupturable membrane, and wherein said rupture means, when activated, is instantaneously caused to rupture said rupturable membrane, wherein said rupture means comprises a puncturing instrument having a first end which comprises a blade, said puncturing instrument further having a second end which comprises a driving means, wherein when said rupture means is activated said driving means propels said blade through said ruptureable membrane so as to result in bursting of said ruptureable membrane and instantaneous release of pressurized gas to the atmosphere, wherein said driving means comprises a rod, a compressed gas cylinder and a latch, wherein said rod has a first end which is detachably connected to said blade, said rod has a mid portion which extends through said compressed gas cylinder, said mid portion of said rod is provided with a gas cylinder piston within said compressed gas cylinder which is drivable by compressed gas within said cylinder, said rod has a second end which is separated from said first end by said mid portion and which terminates in a flange, said latch residing adjacent to said second end of said rod, said latch abutting said flange in a manner which obstructs the travel path and prevents motion of said flange, said latch being maintained in position abutting said flange by action of a solenoid, said compressed gas cylinder being provided with a compressed gas source which acts to drive said compressed gas piston and rod in the direction of said cutting blade, said rod being prevented from motion by the obstructive action of said latch against said flange, said latch being withdrawn from said flange when electrical power to said solenoid is interrupted.

2. A safety valve for selective instantaneous release of pressurized gas to the atmosphere, the safety valve comprising a rupturable membrane and rupture means, wherein said rupture means is positioned in close proximity to said rupturable membrane, and wherein said rupture means, when activated, is instantaneously caused to rupture said rupturable membrane, wherein said rupture means comprises a puncturing instrument having a first end which comprises a blade, said puncturing instrument further having a second end which comprises a driving means, wherein when said rupture means is activated said driving means propels said blade through said ruptureable membrane so as to result in bursting of said ruptureable membrane and instantaneous release of pressurized gas to the atmosphere, wherein said driving means comprises a rod, a compressed gas cylinder and a hydraulic fluid cylinder, wherein said rod has a first end which is detachably connected to said blade, said rod has a mid portion which extends through said compressed gas cylinder, said mid portion of said rod is provided with a gas cylinder piston within said compressed gas cylinder which is drivable by compressed gas within said cylinder, said rod has a second end which is separated from said first end by said mid portion and which terminates in a hydraulic cylinder piston, said second end of said rod being housed within said hydraulic fluid cylinder, said compressed gas cylinder being provided with a compressed gas source which acts to drive said compressed gas piston and rod in the direction of said cutting blade, said compressed gas being provided at a first pressure, wherein the force of said hydraulic fluid on said hydraulic cylinder piston within said hydraulic fluid cylinder being greater than said the force of the compressed gas on said compressed gas piston within the compressed gas cylinder such that said rod is prevented from motion by the obstructive force of hydraulic fluid against said hydraulic cylinder piston within said hydraulic fluid cylinder, said driving means being activated by a loss of hydraulic fluid pressure.

3. An apparatus for discharging the hot operating gas of an indirectly heated gas turbine consisting of a frangible disk and disk puncture means, said frangible disk comprising a first side and a second side which is opposed the first side, said frangible disk being retained between two flanges which are mounted within the ducting of the indirectly heated gas turbine such that said first side resides within the indirectly heated gas turbine and is exposed to hot compressed gas, and such that said second side resides exteriorly to said indirectly heated gas turbine and is exposed to substantially ambient pressure, said puncture means being located adjacent to said frangible disk and comprising a puncture tool and a tool activation means, said tool activation means capable of being selectively activated to propel said puncture tool through said frangible disk thereby instantaneously releasing said hot compressed gas to the exterior of the indirectly heated gas turbine, wherein said tool activation means is activated when overspeed of the indirectly heated gas turbine is detected.

4. The apparatus for discharging the hot operating gas of an indirectly heated gas turbine of claim 3 wherein said tool activation means comprises a compressed gas cylinder and a hydraulic fluid cylinder, said hydraulic fluid cylinder restraining the action of the compressed gas cylinder until said tool activation means is activated, such that when said tool activation means is activated pressure within said hydraulic cylinder is released and said compressed gas cylinder acts to propel said puncture tool through said frangible disk, and said compressed gas cylinder using compressed gas generated by said indirectly heated gas turbine such that said tool activation means is inoperable when said indirectly heated gas turbine is stopped and at below normal operating speeds thus preventing unintentional activation of said apparatus.

5. The apparatus for discharging the hot operating gas of an indirectly heated gas turbine of claim 3 wherein speed of the indirectly heated gas turbine is monitored electronically, and wherein interruption of an electrical signal activates the tool activation means.

6. The apparatus for discharging the hot operating gas of an indirectly heated gas turbine of claim 5 wherein said tool activation means comprises a piston within a compressed gas cylinder, said compressed gas cylinder using compressed gas generated by said indirectly heated gas turbine such that said activation means is inoperable when said indirectly heated gas turbine is stopped and at below normal operating speeds so as to prevent unintentional activation of said apparatus.

7. The apparatus for discharging the hot operating gas of an indirectly heated gas turbine of claim 6 wherein said piston within said compressed gas cylinder is restrained from operation during normal operation using latching means, said latching means being withdrawn in overspeed conditions, wherein said compressed gas cylinder drives an elongate probe, said elongate probe having a sharpened distal end for puncturing said frangible disk, said elongate probe having a flanged near end, wherein said latching means comprises an electric solenoid, a latch, and a spring, and wherein said latch obstructs the motion of said flanged near end of said elongate probe, said latch being inserted and maintained in said obstructing position against the pressure of said spring by said electric solenoid, said latch being withdrawn from said obstructing position on interruption of electrical power to the solenoid as caused by an overspeed condition, by the action of said spring.

8. A gas turbine safety valve system comprising:
a. a gas delivery means having a near end, said gas delivery means having mounted on the near end, a first flange plate;
b. a gas exhaust delivery means having a near end, and a side wall, said gas exhaust delivery means having mounted on the near end, a second flange plate;
c. a ruptureable membrane mounted between said first and second flange plates such that said first and second flange plates secure the ruptureable membrane therebetween;
d. a ruptureable probe system comprising:
 i. a cannular holder securely mounted through the side wall of the gas exhaust delivery means near the near end thereof, said cannular holder supporting and securely holding the ruptureable probe system;
 ii. a drive rod slidable through said cannular holder and extending inside the side wall of the means for supporting and holding the rupturing probe system, said drive rod having a near end, a mid portion, and a distal end;
 iii. a probe capable of rupturing the ruptureable membrane detachedly mounted to the distal end of said slidable drive rod;
 iv. a cylindrical compressed gas housing, said cylindrical compressed gas housing having a near end, a distal end, a distal end integral cap and a side wall, said cylindrical compressed gas housing having openings in or near the distal end integral cap for the flow of gas from the interior of the cylindrical compressed gas housing to the exterior of the cylindrical compressed gas housing and the reverse flow thereof said cylindrical compressed gas housing having a detachable flanged cap on the near end, said flanged cap and said distal end integral cap having centered apertures to accommodate said mid portion of the slidable drive rod therethrough, said cylindrical compressed gas housing having a compressed gas inlet at the near end of the cylindrical compressed housing and through the detachable flanged cap thereof;
 v. a piston securely mounted on the slidable drive rod interior of the cylindrical compressed gas housing above the compressed gas inlet;
 vi. a detachable flange secured to said near end of said slidable drive rod,
 vii. a latch which is positioned to lie between said flange and said cylindrical compressed gas housing so as to confront said flange and to obstruct the motion of said slideable drive rod,
 viii. an electrically powered solenoid for inserting and maintaining said latch in said obstructing position against said flange
 ix. a spring, said spring acting to retract said latch from said obstructing position when said solenoid is deactivated.

9. A gas turbine safety valve comprising,
a. a means for supporting and holding a ruptureable membrane;
b. a means for supporting and holding a rupturing probe system, said rupturing probe system comprising:
 i. a cannular holder securely mounted through a side wall of the means for supporting and holding the rupturing probe system;
 ii. a slidable drive rod through said cannular holder and extending inside the side wall of the means for supporting and holding the rupturing probe system, said drive rod having a near end and a distal end;
 iii. a probe capable of rupturing the ruptureable membrane detachedly mounted to the distal end of said slidable drive rod;
 iv. a cylindrical compressed gas housing, said compressed gas housing having a near end, a distal end, a distal end integral cap and a side wall, said cylindrical compressed gas housing having openings in or near the distal end integral cap for the flow of gas from the interior of the cylindrical compressed gas housing to the exterior of the cylindrical compressed gas housing and the reverse flow thereof, said cylindrical compressed gas housing having a detachable flanged cap on the near end, said flanged cap and said distal end integral cap having centered apertures to accommodate an extension of the slidable drive rod therethrough, said cylindrical compressed gas housing having a compressed gas inlet near the near end of the cylindrical compressed gas housing and through the side wall thereof;

v. a first piston securely mounted on the slidable drive rod interior of the cylindrical compressed gas housing above the compressed gas inlet;

vi. a cylindrical hydraulic fluid housing, said cylindrical hydraulic fluid housing having a side wall and a top cap; said cylindrical hydraulic fluid housing having an opening centered in the top cap to accommodate an extension of the slidable drive rod therethrough, said slidable drive rod having a second piston mounted on the near end thereof, the cylindrical hydraulic fluid housing having a hydraulic fluid inlet through the side wall and at the distal end thereof; said cylindrical hydraulic fluid housing having a hydraulic fluid drain outlet through the cylindrical hydraulic fluid housing side wall and near the near end of the cylindrical hydraulic fluid housing.

vii. a control system for providing hydraulic fluid to the cylindrical hydraulic oil housing;

viii. the force of the hydraulic fluid on the second piston in the cylindrical hydraulic fluid housing being higher than the force of the compressed gas on the first piston in the cylindrical compressed gas housing, in normal operation.

10. A gas turbine safety valve comprising, a. a means for supporting and holding a ruptureable membrane;

b. a means for supporting and holding a rupturing probe system, said rupturing probe system comprising:

i. a cannular holder securely mounted through a side wall of the means for supporting and holding the rupturing probe system;

ii. a slidable drive rod through said cannular holder and extending inside the side wall of the means for supporting and holding the rupturing probe system, said drive rod having a near end and a distal end;

iii. a probe capable of rupturing the ruptureable membrane detachedly mounted to the distal end of said slidable drive rod;

iv. a cylindrical compressed gas housing, said compressed gas housing having a near end, a distal end, a distal end integral cap and a side wall, said cylindrical compressed gas housing having openings in or near the distal end integral cap for the flow of gas from the interior of the cylindrical compressed gas housing to the exterior of the cylindrical compressed gas housing and the reverse flow thereof, said cylindrical compressed gas housing having a detachable flanged cap on the near end, said flanged cap and said distal end integral cap having centered apertures to accommodate an extension of the slidable drive rod therethrough, said cylindrical compressed gas housing having a compressed gas inlet near the near end of the cylindrical compressed gas housing and through the side wall thereof;

v. a first piston securely mounted on the slidable drive rod interior of the cylindrical compressed gas housing above the compressed gas inlet;

vi. a cylindrical hydraulic fluid housing, said cylindrical hydraulic fluid housing having a side wall and a top cap; said cylindrical hydraulic fluid housing having an opening centered in the top cap to accommodate an extension of the slidable drive rod therethrough, said slidable drive rod having a second piston mounted on the near end thereof, the cylindrical hydraulic fluid housing having a hydraulic fluid inlet through the side wall and at the distal end thereof; said cylindrical hydraulic fluid housing having a hydraulic fluid drain outlet through the cylindrical hydraulic fluid housing side wall and near the near end of the cylindrical hydraulic fluid housing vii. a control system for providing compressed gas to the cylindrical compressed gas housing at a predetermined pressure;

viii. a control system for providing hydraulic fluid to the cylindrical hydraulic oil housing;

ix. the force of the hydraulic fluid on the second piston in the cylindrical hydraulic fluid housing, in a standby mode, being higher than the force of the compressed gas on the first piston in the cylindrical compressed gas housing in a standby mode.

* * * * *